US010241750B1

(12) United States Patent
Ralston, Jr.

(10) Patent No.: US 10,241,750 B1
(45) Date of Patent: Mar. 26, 2019

(54) METHOD AND APPARATUS FOR DISABLING AUDIO

(71) Applicant: Columbia Network Security Inc, Camas, WA (US)

(72) Inventor: Richard Ralston, Jr., Camas, WA (US)

(73) Assignee: Columbia Network Security Inc., Camas, WA (US)

( * ) Notice: Subject to any disclaimer, the term of this patent is extended or adjusted under 35 U.S.C. 154(b) by 0 days.

(21) Appl. No.: 16/003,106

(22) Filed: Jun. 7, 2018

Related U.S. Application Data

(60) Provisional application No. 62/622,957, filed on Jan. 28, 2018.

(51) Int. Cl.
| | |
|---|---|
| *H04R 29/00* | (2006.01) |
| *H02B 1/00* | (2006.01) |
| *G06F 3/16* | (2006.01) |
| *H04B 1/3827* | (2015.01) |
| *H04W 4/80* | (2018.01) |
| *H04R 5/04* | (2006.01) |

(52) U.S. Cl.
CPC ........... *G06F 3/165* (2013.01); *H04B 1/3827* (2013.01); *H04R 29/00* (2013.01); *H04R 5/04* (2013.01); *H04R 2420/07* (2013.01); *H04R 2420/09* (2013.01); *H04W 4/80* (2018.02)

(58) Field of Classification Search
CPC ........ H04R 5/04; H04R 29/00; H04R 29/004; H04R 29/005; H04R 2420/00–2420/006
USPC .................. 381/58, 91, 92, 122, 77, 79, 123
See application file for complete search history.

(56) References Cited

U.S. PATENT DOCUMENTS

| | | | |
|---|---|---|---|
| 3,718,765 A | 2/1973 | Halaby | |
| 6,229,897 B1 | 5/2001 | Holthaus et al. | |
| 6,595,792 B1 | 7/2003 | Rudolph et al. | |
| 7,024,175 B1 | 4/2006 | Moquin et al. | |
| 8,019,096 B2 * | 9/2011 | Sander | H04R 1/1041 381/122 |
| 8,774,863 B2 * | 7/2014 | Park | H04M 1/6016 455/557 |
| 9,103,866 B2 * | 8/2015 | Mehrabi | G01R 31/04 |
| 9,158,496 B2 | 10/2015 | Soffer | |
| 9,411,379 B2 | 8/2016 | Rinner et al. | |
| 9,497,579 B2 | 11/2016 | Halevi et al. | |
| 9,519,602 B2 * | 12/2016 | Prentice | H04M 1/72527 |

(Continued)

FOREIGN PATENT DOCUMENTS

JP   H01-146414 A   6/1989

*Primary Examiner* — Xu Mei
(74) *Attorney, Agent, or Firm* — Kaplan IP Law, PLLC; Jonathan T. Kaplan

(57) ABSTRACT

The present invention comprises a microphone simulator or emulator, for use in conjunction with a "personal electronic device" or "PED." The microphone simulator or emulator is used in conjunction with a PED that includes both a built-in microphone, along with an interface by which an external microphone can be utilized. Often, a PED is equipped with no specific user-level interface, by which the built-in microphone of the PED can be disabled. However, the microphone simulator or emulator, when connected to the external microphone interface of a PED, causes the PED to recognize the microphone simulator or emulator as an external microphone. Because of this, the PED disables its built-in microphone.

9 Claims, 1 Drawing Sheet

(56) References Cited

U.S. PATENT DOCUMENTS

| | | | |
|---|---|---|---|
| 9,697,837 B2 | 7/2017 | Hefetz | |
| 2004/0179706 A1* | 9/2004 | van Oerle | H04R 19/016 |
| | | | 381/312 |
| 2007/0098184 A1* | 5/2007 | Ibe | H04R 5/04 |
| | | | 381/77 |
| 2007/0121804 A1* | 5/2007 | Peng | H04M 1/2535 |
| | | | 379/67.1 |
| 2008/0159561 A1* | 7/2008 | Parker | G06F 9/4418 |
| | | | 381/94.5 |
| 2011/0249828 A1 | 10/2011 | Dickson et al. | |
| 2014/0321673 A1* | 10/2014 | Seo | H04R 1/1041 |
| | | | 381/123 |
| 2016/0088426 A1* | 3/2016 | Halevi | H04R 1/06 |
| | | | 455/41.1 |

* cited by examiner

METHOD AND APPARATUS FOR DISABLING AUDIO

As provided for under 35 U.S.C. § 119(e), this patent claims benefit of the filing date of the following U.S. Provisional Patent Application, herein incorporated it by reference in its entirety:

"Method and Apparatus for Disabling an Audio Input," Application No. 62/622,957, filed Jan. 28, 2018.

FIELD OF THE INVENTION

The present invention relates generally to computing devices equipped with audio inputs, audio outputs, or both, and, more particularly, to disabling such audio capabilities.

BACKGROUND OF THE INVENTION

Personal electronic devices, like smartphones, tablets, and laptops, are equipped with an increasingly wide array of sensors and effectors, including, respectively, microphones and audio outputs (e.g., speakers).

Ever since the introduction of cell phones, users have had to contend with their inadvertent use, such as a phone initiating a call simply because of its location in a user's pocket, when the user is engaged in some activity unrelated to the placing of a phone call.

More recently, with the introduction of smartphones, "hacking" (or unauthorized entry) into one of these devices is becoming an increasingly severe problem (since such phones have become, essentially, pocket-sized general-purpose computer systems, that also offer an ability to make phone calls).

Even where an application service provider's ("ASP's") use of a device has technically been legally authorized by its user (e.g., through a "click-through" license), ASP's are increasingly using such personal electronic devices (and, in particular, the device's sensors) for purposes of which the user is not necessarily aware.

For example, companies such as FACEBOOK (Menlo Park, Calif.) and GOOGLE (Mountain View, Calif.) are able to track a user's Internet search behavior across multiple devices.

This cross-device tracking can be accomplished by causing first and second personal electronic devices to operate as, respectively, an audio modem transmitter and audio modem receiver. The audio transmissions are typically ultrasonic, and therefore inaudible to humans. The cross-device tracking can be used for such purposes as ad tracking, ad targeting, and for other user-profiling purposes.

It would therefore be desirable to give users a reliable way of disabling a personal electronic device's audio, so that privacy can be maintained, and unauthorized or unknown uses can be prevented.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION

Figure 1A:
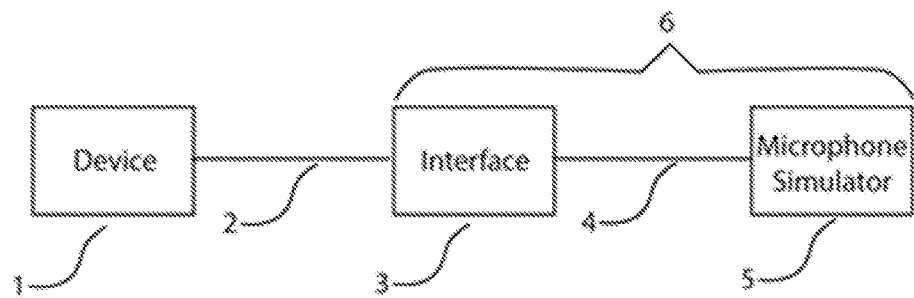
FIG. 1A is a block-diagram-level description of a No Sound Device (or NSD) 6, when used in conjunction with a Personal Electronic Device (or PED) 1.

Reference will now be made in detail to various embodiments of the invention, examples of which are illustrated in the accompanying drawings. Wherever possible, the same reference numbers will be used throughout the drawings to refer to the same or like parts.

Please refer to the section titled "Glossary of Selected Terms," for the definition of selected terms used below.

1 Designs and Embodiments

The present invention comprises a new kind of device, that we shall refer to as a No Sound Device (or NSD), for use in conjunction with a "personal electronic device" or "PED" (please see Glossary, for definition of PED). The NSD typically is used in conjunction with a PED that includes a built-in microphone, a built-in speaker, or both, along with at least one interface by which external audio devices can be utilized.

The NSD is typically small, relative to a PED with which it is used, so that other than the audio-blocking function of the NSD, the PED can be used in as normal a manner as possible. Also, to further enhance an NSD's unobtrusiveness and ease of use, it is typically powered by a port (or interface) of the same PED the NSD is affecting. In the case of a wireless NSD, it can be powered by a port of the PED the NSD is affecting, or the NSD can be powered by any port that is suitably nearby (such as the port of another suitably-near PED).

FIG. 10 depicts, as an example PED, a common configuration for a smart phone 1, that includes a touch screen 10, and a home button 11. Smart phone 1 includes a speaker at area 7, along with a built-in microphone at area 8. Area 9 is a common location for an audio socket (such as one that accepts a 3.5 mm male plug), at which a wired headset can be connected. Typically, smart phone 1 produces audio output at speaker 7, and receives audio input at microphone 8. However, these devices can be disabled by a subsystem of a PED, that we shall refer to as an "audio mixer."

In general, an audio mixer can be described as a subsystem that performs two main functions:

Routing: In general, a PED can (at any one time) produce one stream of audio output and accept one stream of audio input. Collectively, we can refer to these two streams as the PED's "audio channel." Conversely, audio devices are typically organized in pairs (with one device of the pair providing a microphone function, and the other speaker), with each pair having an audio interface to which the audio channel can be connected.

Prioritization: Among the various interfaces to audio devices present in a PED, a major function of an audio mixer, is to decide to which audio interface, at any one time, the mixer's audio channel should connect.

An audio mixer can be comprised of hardware, software, or any combination of the two. It is unusual to find a PED where its audio mixer is equipped with a user-level interface, by which there can be a specific user-selected disabling of the connection, between its audio channel and its built-in microphone or speaker. Typically, an audio mixer responds to the connection of an audio accessory to a PED's wired or wireless external ports (or interfaces), giving control of the audio channel to the last external accessory connected. For example, if a wired headset is connected to smart phone 1 at audio socket 9, the audio channel is switched, from built-in speaker 7 and built-in microphone 8 (which are thereby disabled), to the wired headset. As a further example, if a wireless headset (e.g., Bluetooth) is then also connected to smart phone 1, the PED's audio channel can then be switched to the wireless headset (leaving disabled both the wired headset, as well as built-in speaker 7 and built-in microphone 8).

Thus, the approach of the present invention is to effectively disable the audio device or devices, of a first audio interface of a first PED, by switching the audio channel of the PED to a simulation or emulation of an external audio accessory, where the simulation or emulation is of a microphone, a speaker, or both. The complete device for accomplishing this switching, that includes both the simulator or emulator, and an interface for connecting the simulator or emulator with a PED, is referred to herein as a "No Sound Device" (or NSD). As discussed further below, the simulation or emulation is chosen such that the privacy needs, security needs, or both, of the PED's user are satisfied. This simulation or emulation can be connected to the external wired or wireless port (or interface) of a PED, causing the PED's audio mixer to give control of its audio channel over to the simulator or emulator.

Figure 1B:
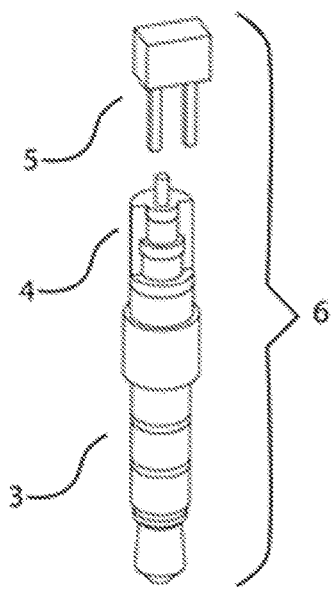
FIG. 1B depicts a particular embodiment of an NSD.

FIG. 1A is a block-level diagram of an NSD 6, when used in conjunction with a PED 1, while FIG. 1B depicts a particular embodiment of an NSD 6.

Figure 1C:
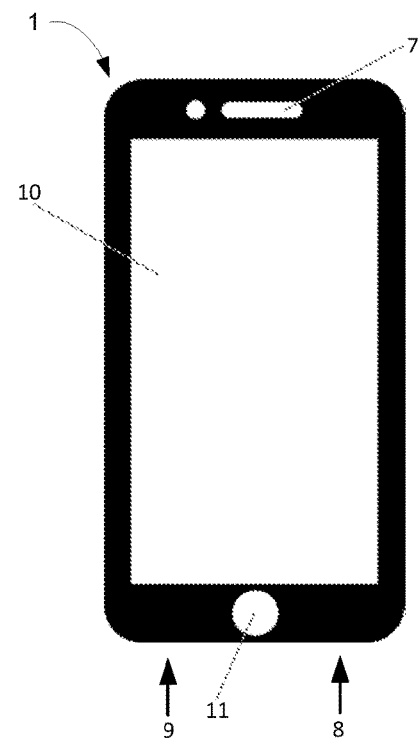
FIG. 1C depicts a typical smartphone, with which the NSD can be used.

Item 1, of FIG. 1A, represents any PED with an audio input or output (such as smart phone 1 of FIG. 1C).

Item 2 of FIG. 1A represents any suitable connection device, by which the PED couples to an external speaker or microphone. If connection device 2 couples by use of electrical wire, item 2 can be realized, for example, with a socket, capable of receiving a "Tip Ring Ring Sleeve" (or "TRRS") type plug. Often, for PED's, the TRRS socket is capable of receiving a plug with a diameter of 3.5 mm. Alternatively, if connection device 2 couples wirelessly, item 2 can represent an antenna and transceiver, capable of sending and receiving radio waves formed according to an appropriate standard (such as Bluetooth).

Section 6 of FIG. 1A represents the above-described No Sound Device, which electronically disables audio input, audio output, or both. As can be seen, it is comprised of items 3, 4, and 5, each of which will now be discussed.

Item 3 represents the interface or the physical connection device, that permits coupling between the NSD, and the PED with which it is to be used. In FIG. 1B, item 3 is a TRRS 3.5 mm plug. Item 3 can use any appropriate type of coupling, physical or wireless. For example, if the coupling is wireless, then item 3 can be any appropriate wireless transceiver, such as a Bluetooth transceiver.

Item 4 is a connection or coupling, between interface 3 and the microphone simulator or emulator of item 5.

Item 5 is the microphone simulator or emulator. It can consist of an electronic, semiconductor based, design, which acts as an adjustable voltage, constant current, load. However, any kind of circuit, that mimics the actual electrical behavior of a microphone, can be used. Typically, the microphone simulator or emulator produces, at its output terminals, electrical signals indicative of when no sound pressure is applied to an actual microphone's pressure-sensing diaphragm. Were item 5 an actual microphone, this would correspond to a microphone attempting to record, when placed in a "silent" environment (i.e., an environment producing no audible input levels).

In the case where item 3 is acting as a wireless transmitter, of digitized audio signals to a PED (e.g., item 3 is a Bluetooth transceiver), the microphone simulator or emulator can itself be digital. The microphone simulator or emulator can produce a digital value (or digital values) corresponding to, for example, no sound pressure applied to an actual microphone's pressure-sensing diaphragm.

With regard to the speaker part of an audio accessory, its simulation or emulation is sufficiently simple, such that an item representing its functionality is not specifically shown in FIG. 1A or 1B. For the case of an NSD that couples to its PED by wire, it is typically achieved with just an open circuit, that accepts speaker drive signals, but does not connect them to an audio output device. For a wireless NSD, it is an electronic subsystem that simply acts like an open circuit.

While device 6 is called an NSD, it need not present a simulation or emulation of just "no sound." Any suitable signal or signals can be produced, by the microphone simulator or emulator, so long as it provides sufficient blocking of actual sounds in the user's environment. The microphone simulator or emulator could, for example, do the following:

Intermittently receive sound waves from the environment, such that the sound signal provided to the PED becomes a series of disconnected segments.

Artificially generate a tone or a repetitive tune, that has no actual relationship to the PED's environment.

Circuit 5 of FIG. 1B compensates for the different voltage requirements, of different PED's, by switching its output voltage automatically. The expected voltage levels differ according to a variety of factors, including but not limited to:

Whether the PED is a smartphone, tablet, or computer.

The PED's operating system (e.g., iOS, Android, Windows, Linux, MacOS, Unix, etc.).

Any other choices, regarding hardware, software, or both.

The adaptability of item 5 results in an NSD that can work with a wide variety of PED's.

More specifically, a MOSFET can be configured as a constant current flow diode.

In comparison, a short circuit or a resister, used as a microphone simulator or emulator, will not be reliably recognized, by its PED, as a microphone.

The internal circuitry of a PED is often designed to detect the power consumption of an external microphone. If it is too large or too small, the PED may treat the external microphone as a failed component and revert back to using the PED's built-in microphone.

Application of the invention is not limited to the disabling of a built-in microphone, built-in speaker, or both, when an NSD is connected to a first external audio interface of a PED. The invention can be applied to any kind of PED, so long as connection of the NSD to a first external audio interface, disables some other audio interface of the PED. The other audio interface could be, for example, a second external audio interface.

2 Glossary of Selected Terms

Personal Electronic Device (PED): any of a wide variety of electronic devices designed for, in general, use by single-person, or by a small group of persons (e.g., 5 persons or less). A PED generally includes a computer system, along with an appropriate user interface. Specific examples of PED's include, but are not limited to: smartphones (e.g., an (PHONE by APPLE or an ANDROID phone), smart speakers (e.g., the AMAZON ECHO), laptop computers, tablets (also called a "tablet computer"), television sets, and a wide variety of devices under the category of "IoT" (Internet of Things).

Audio Accessory: any system, external to the PED to be blocked, providing microphone functionality, speaker functionality, or both.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for a personal electronic device, comprising:
   selecting, with a first audio mixer of the personal electronic device, a first audio interface for connection to a first audio channel of the personal electronic device, wherein the first audio interface couples to at least a first built-in microphone of the personal electronic device;
   coupling a first electronic device to a second audio interface of the first personal electronic device, wherein the first electronic device is external to the first personal electronic device;
   providing first signals, from the first electronic device to the second audio interface, that emulate a microphone in an approximately silent environment;
   switching, with the first audio mixer and in response to the provision of the first signals of the first electronic device to the second audio interface, the first audio channel from the first audio interface to the second audio interface.

2. The method of claim 1, wherein the second audio interface comprises a socket, adapted to receive a tip-ring-sleeve type plug.

3. The method of claim 2, wherein the tip-ring-sleeve type socket is adapted to receive a TRRS 3.5 mm plug.

4. The method of claim 1, wherein the second audio interface includes a first wireless transceiver.

5. The method of claim 4, wherein the first wireless transceiver complies with the Bluetooth standard.

6. The method of claim 4, wherein the first electronic device includes a second wireless transceiver.

7. The method of claim 1, wherein the first electronic device produces the first signals with a constant current source.

8. The method of claim 7, wherein the constant current source is an appropriately configured MOSFET.

9. The method of claim 1, wherein the first electronic device produces digital signals indicative of a microphone in the approximately silent environment.

* * * * *